United States Patent
Aldrin et al.

(10) Patent No.: US 9,906,439 B2
(45) Date of Patent: Feb. 27, 2018

(54) AD-HOC ON-DEMAND ROUTING THROUGH CENTRAL CONTROL

(71) Applicant: FUTUREWEI TECHNOLOGIES, INC., Plano, TX (US)

(72) Inventors: Sam K. Aldrin, Santa Clara, CA (US); Charles Perkins, Saratoga, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 111 days.

(21) Appl. No.: 14/069,699

(22) Filed: Nov. 1, 2013

(65) Prior Publication Data

US 2015/0124625 A1    May 7, 2015

(51) Int. Cl.
  *H04L 12/717* (2013.01)
  *H04L 12/751* (2013.01)
  (Continued)

(52) U.S. Cl.
  CPC .............. *H04L 45/42* (2013.01); *H04L 45/10* (2013.01); *H04L 47/16* (2013.01); *H04W 40/12* (2013.01)

(58) Field of Classification Search
  CPC .............................. H04W 80/04; H04W 88/06
  USPC .......................................................... 370/238
  See application file for complete search history.

(56) References Cited

U.S. PATENT DOCUMENTS 7,047,316 B2 * 5/2006 Iwata ...................... H04L 45/00
                                                                370/238

2004/0228323 A1 * 11/2004 Acharya ................. H04L 45/00
                                                                370/351

(Continued)

FOREIGN PATENT DOCUMENTS

| CN | 1910857 | 2/2007 |
| CN | 101772122 | 7/2010 |
| CN | 102550118 | 7/2012 |

OTHER PUBLICATIONS

Perkins, Charles; Royer, Elizabeth; Ad-hoc On-Demand Distance Vector Routing.*

(Continued)

*Primary Examiner* — Mang Yeung
*Assistant Examiner* — Peter G Solinsky
(74) *Attorney, Agent, or Firm* — Vierra Magen Marcus LLP

(57) ABSTRACT

System and method of ad hoc on-demand routing by virtue of central control. A central controller of a network can communicate directly with a route-requesting network device regarding discovery of a data transmission path and perform route computation. A source network device may query the central controller with a unicast route request. In response, the central controller can identify a feasible route based on the topology information of the network. The central controller may also receive a broadcast route request along with other network nodes. As a result, the source device can be offered to select from two resultant routes, one provided by the central controller in a centralized manner and the other provided by the destination device. Further, the central controller can be used specifically for computation of constrained routes by incorporating global constraints. The central controller may be a software defined network (SDN) controller.

16 Claims, 8 Drawing Sheets

(51) Int. Cl.
  *H04L 12/801*   (2013.01)
  *H04W 40/12*   (2009.01)

(56) References Cited

U.S. PATENT DOCUMENTS

| | | | | |
|---|---|---|---|---|
| 2005/0157661 | A1* | 7/2005 | Cho | H04L 45/42 |
| | | | | 370/254 |
| 2006/0002368 | A1* | 1/2006 | Budampati et al. | 370/351 |
| 2006/0007882 | A1* | 1/2006 | Zeng | H04L 45/00 |
| | | | | 370/328 |
| 2006/0040670 | A1* | 2/2006 | Li | H04L 45/42 |
| | | | | 455/445 |
| 2007/0110024 | A1* | 5/2007 | Meier | H04L 45/04 |
| | | | | 370/351 |
| 2007/0111732 | A1* | 5/2007 | Li | H04W 40/246 |
| | | | | 455/445 |
| 2007/0211786 | A1* | 9/2007 | Shattil | 375/141 |
| 2008/0084856 | A1* | 4/2008 | Ramachandran | H04B 7/155 |
| | | | | 370/342 |
| 2008/0151811 | A1* | 6/2008 | El-Damhougy | H04B 7/18584 |
| | | | | 370/316 |
| 2008/0304485 | A1* | 12/2008 | Sinha | H04L 12/66 |
| | | | | 370/392 |
| 2008/0317047 | A1* | 12/2008 | Zeng | H04L 45/00 |
| | | | | 370/401 |
| 2009/0129376 | A1* | 5/2009 | Johnson | H04L 45/04 |
| | | | | 370/357 |
| 2010/0322141 | A1* | 12/2010 | Liu et al. | 370/315 |
| 2011/0286418 | A1* | 11/2011 | Liu | H04L 45/125 |
| | | | | 370/329 |
| 2012/0195431 | A1* | 8/2012 | Garcia Morchon et al. | 380/270 |
| 2013/0013125 | A1* | 1/2013 | Booth | H02J 13/0013 |
| | | | | 700/298 |
| 2013/0028091 | A1 | 1/2013 | Sun et al. | |
| 2013/0094398 | A1* | 4/2013 | Das | H04W 12/00 |
| | | | | 370/254 |
| 2013/0250809 | A1* | 9/2013 | Hui et al. | 370/255 |
| 2014/0023074 | A1* | 1/2014 | Mishra et al. | 370/390 |
| 2014/0086080 | A1* | 3/2014 | Hui | H04L 45/124 |
| | | | | 370/252 |
| 2014/0126410 | A1* | 5/2014 | Agarwal et al. | 370/252 |
| 2014/0376530 | A1* | 12/2014 | Erickson et al. | 370/338 |
| 2015/0046074 | A1* | 2/2015 | Challapali et al. | 701/117 |
| 2015/0055506 | A1* | 2/2015 | Birlik | H04W 16/10 |
| | | | | 370/254 |
| 2015/0063112 | A1* | 3/2015 | Wu et al. | 370/235 |
| 2015/0089081 | A1* | 3/2015 | Thubert | H04L 45/12 |
| | | | | 709/239 |
| 2015/0117451 | A1* | 4/2015 | Kaneriya et al. | 370/392 |

OTHER PUBLICATIONS

Vaios, Athanasios; Oikonomou, Konstantinos; Pellati, Pietro; Simoens, Sebastien; and Stavrakakis, Ioannis; A Dual-Band HiperLAN/2-based Architecture for Indoor Hotspot Applications (2004).*

IETF RFC3561, Jul. 2003.*

"Dynamic MANET On-Demand (AODVv2) Routing draft-ietf-manet-aodvv2-00" C, Perkins, et al. Mobile Ad hoc Networks Working Group Internet-Draft Intended State: Standards Track Expires: Sep. 13, 2013 pp. 1-60.

"Generalized Mobile Ad Hoc Network (MANET) Packet/Messaeg Format" Clausen, et al. Network Working Group Request for Comments: 5444 Category: Standard Track, pp. 1-60.

Search Report dated Aug. 12, 2016 in European Patent Application No. 14857640.8, 8 pages.

* cited by examiner

AD-HOC ON-DEMAND ROUTING THROUGH CENTRAL CONTROL

TECHNICAL FIELD

The present disclosure relates generally to the field of communication network, and, more specifically, to the field of ad hoc and on-demand routing of network.

BACKGROUND

Ad hoc and on-demand routing is an important and critical aspect of networking, whereby network devices need not populate all of the routes and route computation is by way of on-demand requests. It is fundamentally useful as the network elements can be dynamic, mobile and simple. For example, Ad-hoc On-demand Distance Vector Version 2 (AODVv2) routing protocol is one conventional protocol designed for ad hoc mobile networks where the routes are learned by way of on-demand requests and routing tables are populated only when needed. The protocol provides a mechanism and message types to request and respond during route discovery.

In a conventional AODV model, three types of packets are used for purposes of route discovery, represented respectively as route request (RREQ), route reply (RREP), and route error (RERR). RREQ carries the message to query for a route and is broadcast over the network with a link local multicast address and with a time-to-live field value. e.g., 255. When an intermediate router receives the RREQ, it processes that message and, if it is not the owner of destination address, it rebroadcasts the RREQ. RREP is used as a reply from the destination device and is typically sent back to the source device via unicast. During a normal data plane forwarding operation, where there is no route for the packet to be forwarded to the destination, an RERR message is sent back to the source.

For instance, when a source device S needs to send data to a destination device D, S may or may not have a route for D. If the route is unknown by S for example, S can broadcast a RREQ packet with a link local multicast address. Other network devices that retransmit the request packet from S will at least temporarily maintain a route back to S. Once the RREQ packet is received at the destination, D can unicast a RREP packet, back towards S. It can be assumed that each network device receiving the RREP has received the RREQ which triggers the RREP, and so already has a route to S. Given the information included in the RREP, the receiving devices can update or create a route to D by retransmitting the RREP to the next stop along the way to S. If a device receiving the RREP (e.g., for S's discovery of a route to D) doesn't have a route for the source S, it can reply with a RERR message back to the destination D.

In a conventional ad hoc on-demand model, route maintenance is performed in order to avoid prematurely expunging routes from the routing table and causing interruption to data traffic. When an intermediate forwarding device X does not have an active link/route to forward the packet, X also needs to respond back to the source with a RERR message, so that the nodes could re-learn the routes. Receipt of RERR will typically cause the route discovery operation to be initiated by the network element which was unsuccessful in transmitting the packet triggering the RERR message.

Each network router maintains a routing table, where the router stores its route entries which may be populated by various IGP and EGP protocols for example. In fixed networks, where the network is stable and static, the routing table is traditionally huge in size, and requires the node to have a high storage capacity. To reduce size of routing tables and thus increase the mobility of the network, in a conventional AODV model, a network node only keeps active paths in its routing table. However, this leads to a large number of route requests in case of the frequent network changes and disparate traffic, e.g., frequent addition of new network nodes. The broadcast of a large number of route requests tends to aggravate network traffic, increase interference and consume more power, which are highly undesirable.

SUMMARY OF THE INVENTION

Therefore, it would be advantageous to provide an ad hoc on-demand routing mechanism through which a data transmission route can be discovered to reduced communication traffic.

Embodiments of the present disclosure employ a centralized control entity of a network to communicate directly with a route-requesting network device, or a source device, in order to discover a data transmission path and to perform offline route computation in a centralized manner. The centralized control entity, or central controller, has access to topology information of the network and thereby can often determine a route for a node comprehensively and efficiently without relying on transmission of messages among intermediate network nodes. A source network device may query the central controller with a unicast route request without triggering a broadcast to the network. In response, the central controller can identify a feasible route linking the source device and the specified destination device based on the topology information of the network, and sends back the route response to the source device. By utilizing this central control, route computation can be performed offline from the network, without the need to trigger a broadcast storm of RREQ/RREP messages. The central controller may also receive a broadcast route request along with other network nodes. As a result, the source device can be offered to select from two resultant routes, one computed by the central controller in a centralized manner and another provided by the destination device. Further, the central controller can be used specifically for computation of constrained routes by incorporating global constraints. The central controller may be implemented as software or hardware logic, and physically can be either distributed or centralized in a network. The central controller may be a control manager in a software defined network (SDN).

In one embodiment of the present disclosure, a method of routing data in an ad-hoc communication network comprising a plurality of network nodes and a central controller comprises: (1) receiving a routing request sent from a first network node to the central controller, wherein the routing request comprises a request to identify a transmission path for routing data from the first network node to a second network node; (2) at the central controller, determining an identified transmission path based on a topology of the ad-hoc communication network in response to the routing request, wherein the identified transmission path is available for data transmission between the first network node and the second network node; and (3) sending a routing response to the first network node through unicast, wherein the routing response identifies the identified transmission path.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1A:
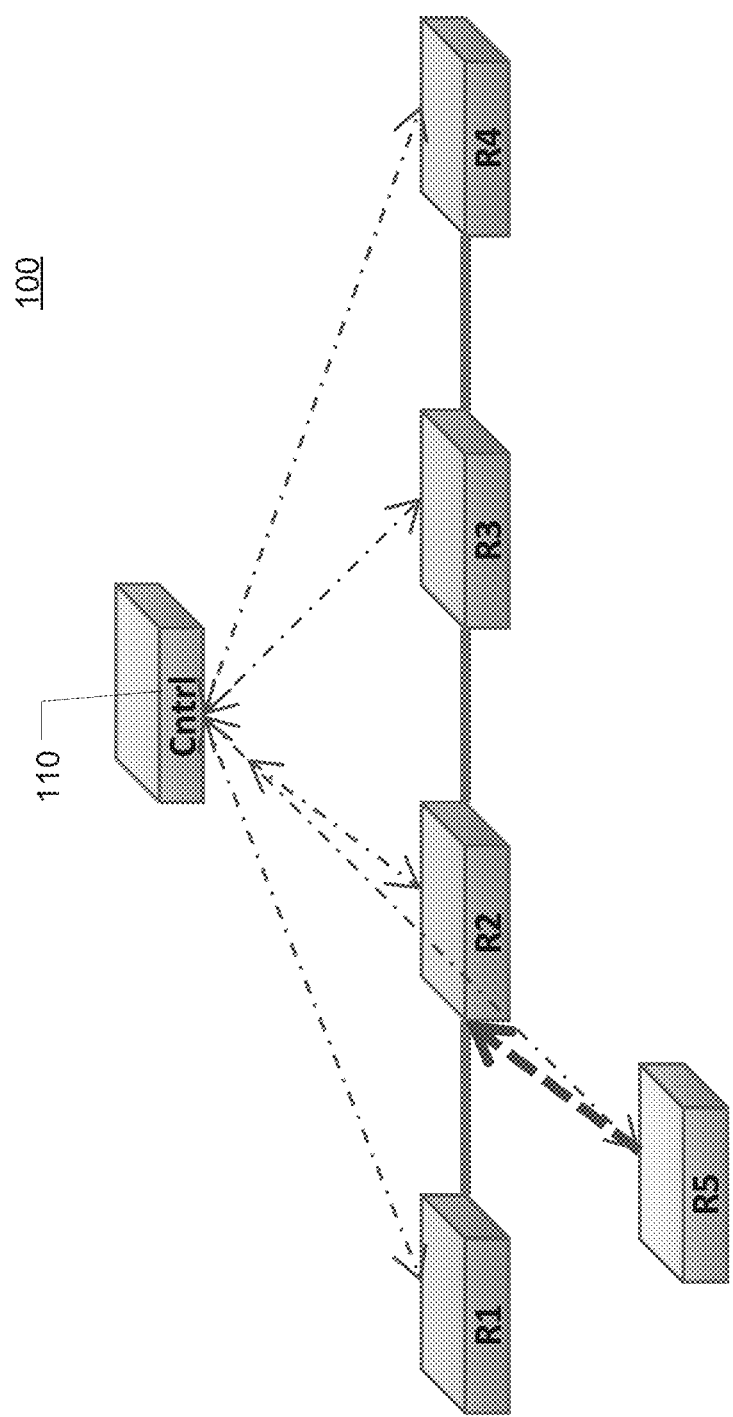
FIG. 1A is a diagram illustrating an exemplary network in which a data transmission path can be determined by a central controller in response to a unicast route request in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Ad-Hoc On-Demand Routing Through Central Control

Embodiments of the present disclosure pertain to systems and methods of ad hoc on-demand routing by use of a central controller of a network to determine efficient data transmission routes while reduce communication traffic during route discovery processes. A central controller can communicate directly with a route-requesting network device regarding discovery of a data transmission path and perform route computation. A source device may query the central controller with a unicast route request. In response, the central controller can identify a feasible route comprehensively and efficiently based on the topology information of the network without relying on transmission of messages among intermediate network nodes. The central controller may also receive a broadcast route request as long with other network nodes. As a result, the source device can be offered to select from two resultant routes, one provided by the central controller in a centralized manner and the other provided by the destination device. Further, the central controller can be used specifically for computation of constrained routes by incorporating global constraints. The central controller may be a software defined network (SDN) controller.

FIG. 1A is a diagram illustrating an exemplary network 100 in which a data transmission path can be determined by a central controller in response to a unicast route request in accordance with an embodiment of the present disclosure. For purposes of illustration, the network 100 is in a simplified form and includes a central controller 110 and a plurality of network nodes, e.g., R1, R2, R3, R4 and R5. In this embodiment, the central controller 110 is connected to all the network nodes R1-R5 and has the access to the topology information of the network which can be used to determine a transmission path, e.g., between a pair of network nodes. During operation, a route-requesting device, or a source device, e.g., R5, can send a route request, e.g., for a data transmission route between R5 and R4, directly to the central controller by virtue of unicast and thus without triggering a broadcast to all network nodes, advantageously reducing the frequency of request and response message transmission among the network 100.

When receiving the route request, the central controller can identify the network elements R4, and R5 and their location in the network, and compute a suitable route for data transmission. The route computation is performed in a centralized and offline manner at the central controller, which advantageously eliminates the need for engaging other network devices to retransmit the route request, and thereby reduces the communication traffic during the computation process. Further, with the capability of utilizing the topology information comprehensively for route computation, the central controller can effectively yield a superior route. The identified route can then communicated to R5 through a unicast route response. Accordingly, R5 can update its routing table to transmit a data packet.

The requesting device R5 may be a newly added network element to the network 100 for example, and can be configured by the central controller 110 with respect to various network element properties and setups. The present disclosure is not limited to any specific mechanism that can be used by the central controller to configure and communicate with a network element. For example, the OpenFlow methodology can be used.

A route table may include various attributes that are well known in the art, such as route address, route prefix, next stop address, next hop interface, expiration time, route metric/cost, and/or state of route. As will be appreciated by those skilled in the art, the route messages, e.g., route request (RREQ), route response (RREP), route error (RERR), in accordance with the present disclosure may be in any suitable format and communicated between a central controller and a network device in any suitable means. In some embodiments, the communication between the central controller and a network device is compliant with the OpenFlow protocol.

Table 1 provides an exemplary route table format that can be used by a network device to transmit data in accordance with an embodiment of the present disclosure. As described above, a route table associated with a source device can be programmed, configured and/or updated according to communication between the source device and the central controller.

---

RFC 5444 Message Header (optionally, with MsgTLVs)
AddrBlk := {OrigNode,TargNode}
AddrBlk.PrefixLength [OrigNode OR TargNode] (Optional)
OrigSegNumTLV AND/OR TargSegNumTLV
MetricTLV {OrigNode, TargNode}(Optional)
Added Node Address Block (Optional)
AddrEilk.PrefixLength [OrigNode OR TargNode] (Optional)
OrigSegNumTLV AND/OR TargSegNumTLV

---

It will be appreciated by those skilled in the art that the topology information referred herein can include physical and/or logical topology information, such as the placement of the network's various components. e.g., device location and cable installation, logical connections among the elements within a network, distances between nodes, physical interconnections, transmission rates, and/or signal types, etc.

The central controller 110 may compute and identify a route in accordance with any routing algorithm that is well known in the art, such as adaptive routing, deflection routing, edge disjoint shortest pair algorithm, Dijkstra's algorithm, fuzzy routing, geographic routing, Heuristic routing, hierarchical routing, IP forwarding algorithm, etc.

As will be appreciated by those skilled in the art, the present disclosure is not limited to any specific type of network comprising a central control mechanism, e.g., wireless local area network (WLAN), network, local area network (LAN), and wide area network (WAN), and etc. In some embodiments, the network 100 may comprise a software defined network (SDN) the intelligence system (the control plane) that controls the data traffic is implemented as software application program and decoupled from the underlying system that forwarding the traffic to the selected destination (the data plane).

An SDN in which a path can be discovered on an ad hoc on-demand basis may be structured in accordance with any suitable SDN architecture model that is well known in the art, e.g., a centralized SDN model, a distributed SDN model, or a hybrid SDN model. In the centralized model, a centralized manager with a single controller can communicate with distributed data planes. In the distributed SDN model, a centralized manger interface can communicates with combined distributed controller and data planes. In a hybrid SDN model, a centralized manager communicates with separate distributed controller and data planes.

The central controller capable of determining a route may be the centralized manager, or SDN controller, in any of the foregoing network models. In some embodiments, the central controller in accordance with the present disclosure can implemented as a software program in the control plane of the SDN. In some other embodiments, the central controller may be implemented as hardware logic, or a combination of hardware and software in the control plane. In some embodiments, the central controller may be a logically centralized entity but physically distributed among multiple components in the network.

The network devices, or nodes, may include routers, switches, or any devices that act as routers or switches, e.g., servers, desktops, mobile computing devices, etc.

Figure 1B:
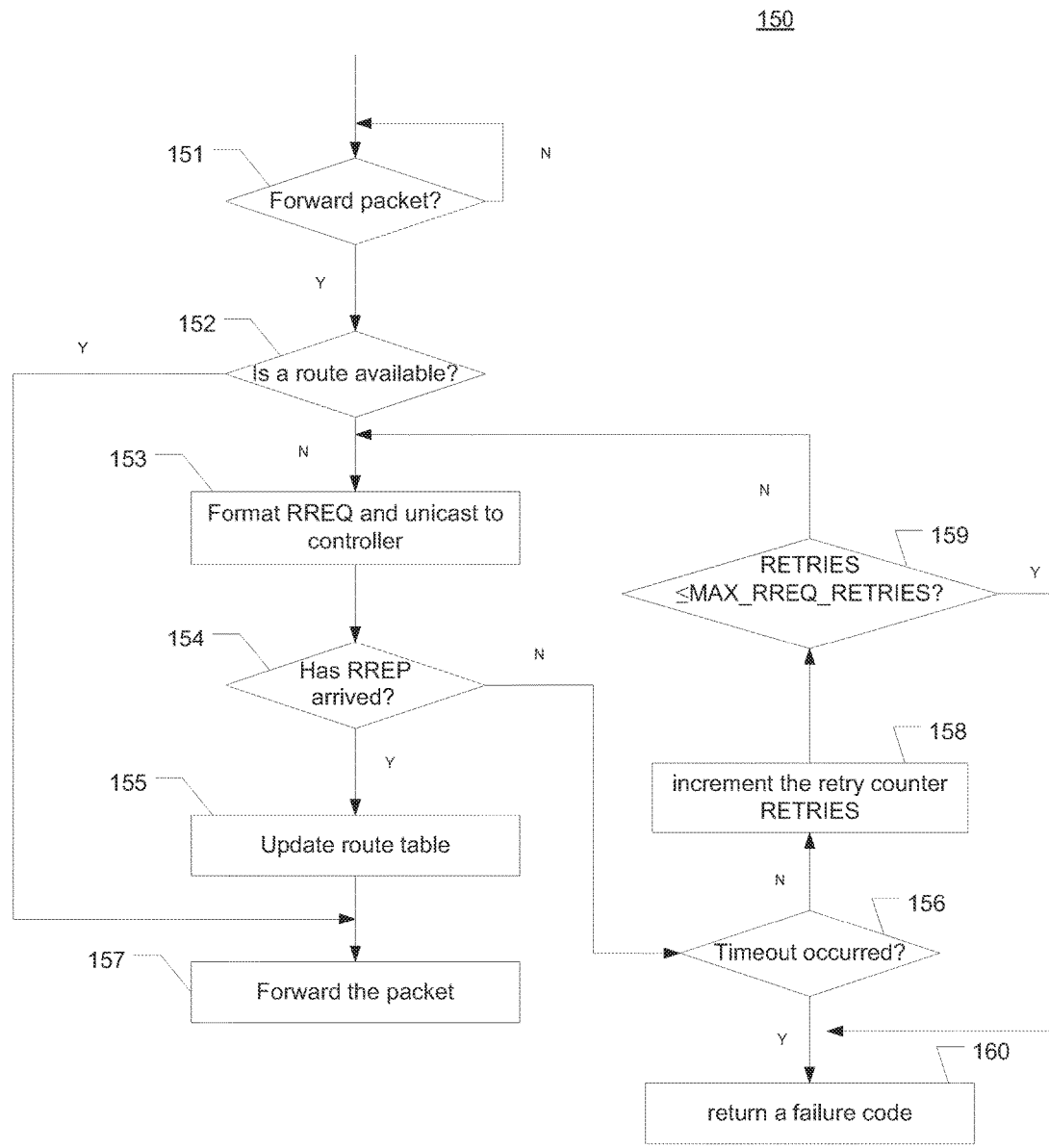
FIG. 1B is a flow chart depicting an exemplary process for a network node to discover a route in an ad hoc on-demand network by sending a unicast route request to a central controller in accordance with an embodiment of the present disclosure.

FIG. 1B is a flow chart depicting an exemplary process 150 for a network node to discover a route in an ad hoc on-demand network by sending a unicast route request to a central controller in accordance with an embodiment of the present disclosure. The process 150 may be implemented as a software program, hardware logic, or a combination thereof, in a network device, e.g., a router. When a source node decides to forward a data packet at 151, it first determines at 152 whether there is a route to the desired destination node currently known or available. For instance, the source node may be a device that joins the network as a new or temporary element and thus has no information as to a viable route to send a data packet.

If it is determined at 152 that a route is available, the packet can be transmitted accordingly at 157. If it is determined that a route is not available, the source node can generate a route request message (RREQ) and send it to the central controller via unicast. For instance, the route request message may be in the similar format as the RREQ used in a conventional AODV model. The route request message is to be processed by a central controller which can identify a feasible route between the source and destination nodes, as described with reference to FIG. 1A.

If a route response message (RREP) is received at the source device, as determined at 154, the route information provided in the response is used to update the route table at 155 so that the incoming data packet can be transmitted between the source and the destination node in the identified route at 157. If a route response message is not received by the source node within a predetermined interval, and if timeout occurs at 156, a failure code can be returned. However, if timeout has not occurred at 156, a retry counter RETRIES can be incremented by 1 at 158 and then compared with the predetermined maximum number of retries MAX_RREQ_RETRIES at 159. If the number of retries has not reached MAX_RREQ_RETRIES, the foregoing 153-158 can be repeated. If the number of retries has reached MAX_RREQ_RETRIES, a failure code can be returned at 160.

Figure 2A:
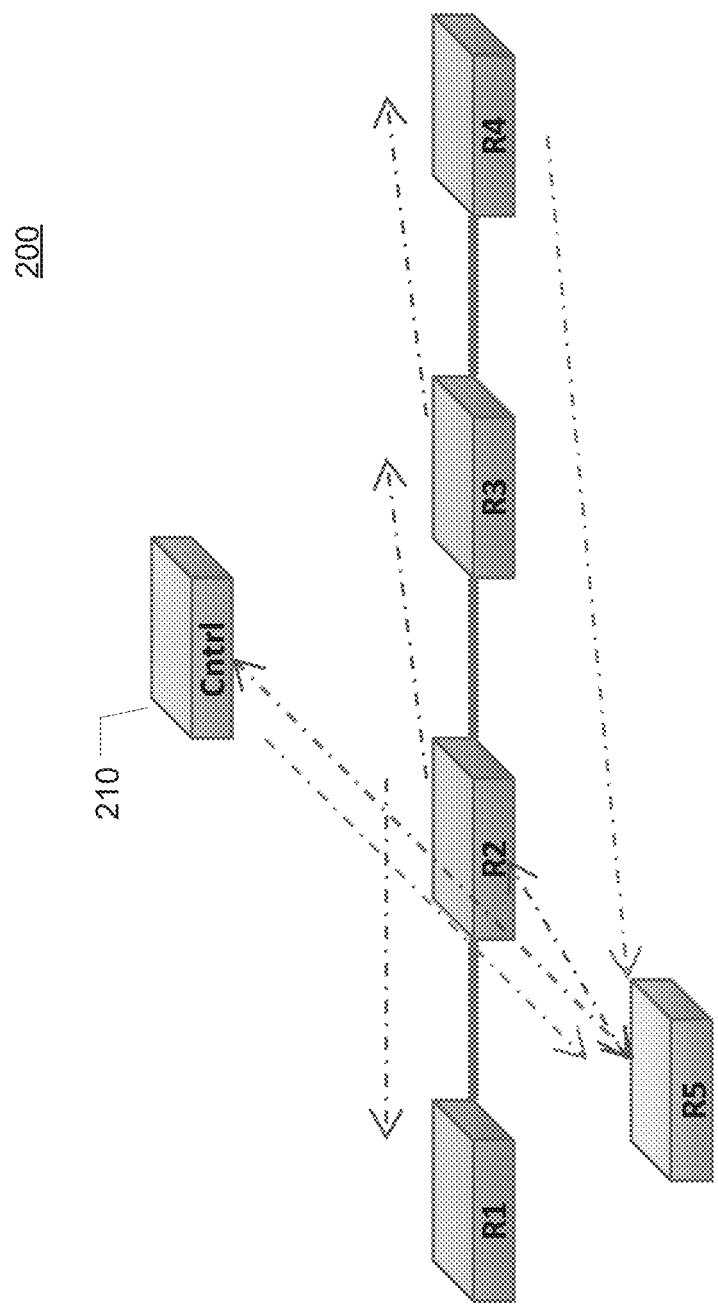
FIG. 2A is a diagram illustrating an exemplary network in which a data transmission path can be determined by a central controller in response to a broadcast route request in accordance with an embodiment of the present disclosure.

FIG. 2A is a diagram illustrating an exemplary network in which a data transmission path can be determined by a central controller in response to a broadcast route request in accordance with an embodiment of the present disclosure. The network 200 may have a similar composition and configuration as network 100 in FIG. 1. In this embodiment, the source node R5 broadcasts a route request message to the network 200 with link local multicast address. The route request is delivered to the other network nodes, e.g., R1-R4, as well as the central controller 210.

In response to the broadcast route request, a feasible route can discovered in accordance with a conventional AODV model. The destination node, e.g., R4, can unicast a response packet back to the node R5 with the recorded node. The process of route request propagation, route recoding and route maintenance can be similar as in the AODV model. In parallel, upon receiving the broadcast route request, the central controller 210 can determine another route in a centralized manner, as described in greater detail with reference to FIG. 1A, and unicast a response message to R5 with the route. If the two routes provided from R4 and the central controller are different, R5 can select a route from the two options and program the route table accordingly for following data transmission.

Figure 2B:
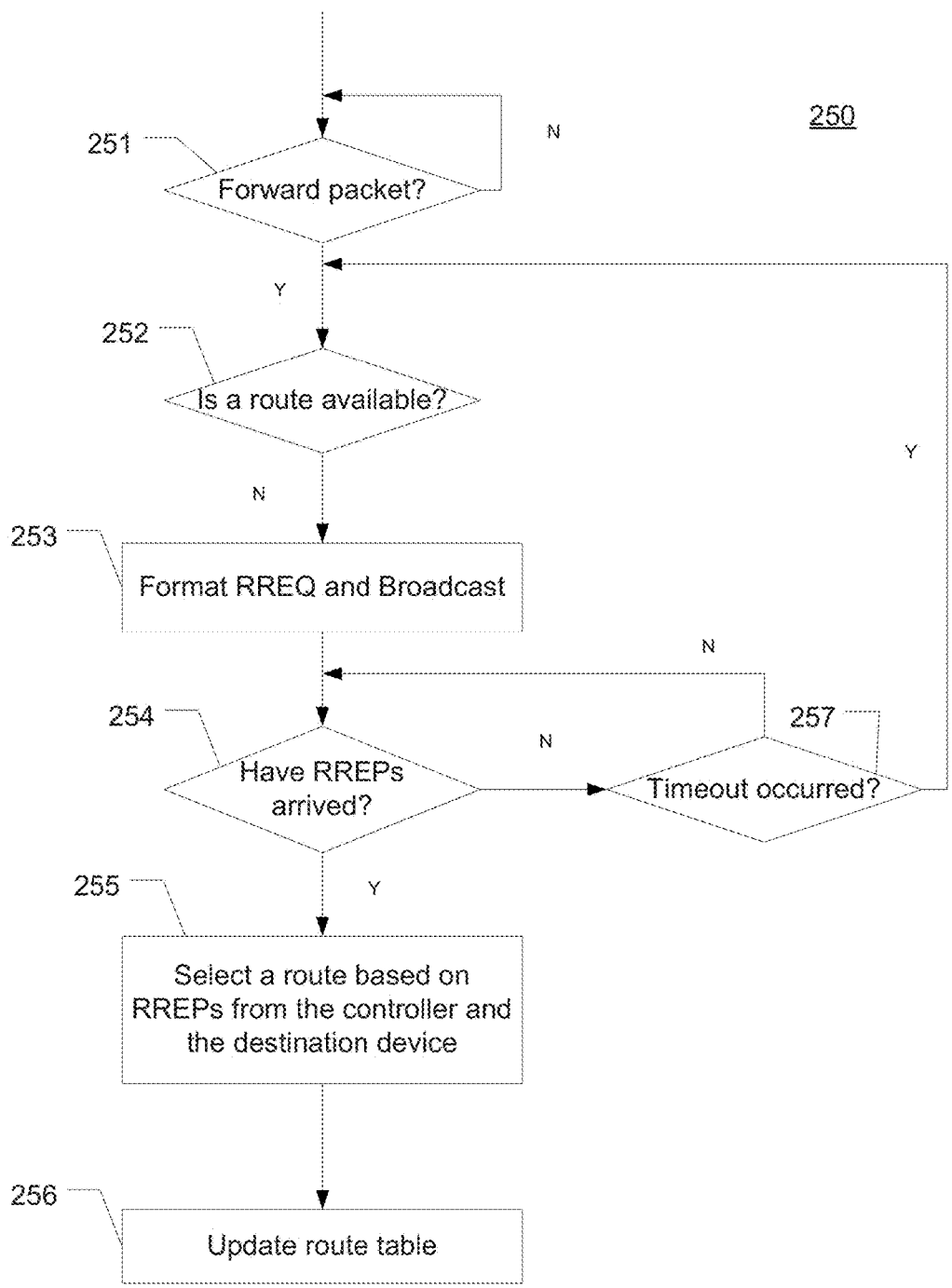
FIG. 2B is a flow chart depicting an exemplary process for a network node to discover a route in an ad hoc on-demand network by broadcasting a route request to a central controller and the other network nodes in accordance with an embodiment of the present disclosure.

FIG. 2B is a flow chart depicting an exemplary process for a network node to discover a route in an ad hoc on-demand network by broadcasting a route request to a central controller and the other network nodes in accordance with an embodiment of the present disclosure. The process 250 may be implemented as a software program, hardware logic, or a combination thereof, in a network device, e.g., a router. When a source node decides to forward a data packet at 251, it first determines at 252 whether there is a route to the desired destination node currently available or known to the source node.

If it is determined that a route is currently unavailable or unknown, the source node can generate a route request message and broadcast it to the network at 253. For instance, the route request message may be in the similar format as the RREQ used in a conventional AODV model. The route request message is to be processed by a central controller as well as other devices receiving the broadcast request. Two feasible routes linking the source and the destination nodes can be identified and provided by the destination node and the central controller in respective mechanisms, as described above with reference to FIG. 2A.

If the route response messages are received at the source device, as determined at 254, and if different routes are identified in the messages, the source device can select a route in accordance with any suitable criteria at 255 and program the route table accordingly at 256. If a route response message is not received by the source node within a predetermined interval, time out occurs at 257 and the foregoing 252-254 can be repeated.

In general, routing can be subject to a set of constraints with respect to at least one of Quality of Service (QoS), priority, policy, price, and etc. As will be appreciated by those skilled in the art, the central controller can be utilized for constraint-based path computation based on any suitable algorithm that is well known in the art, for example upon receiving a route request message that specifies routing constraints.

In a conventional AODV model, as the route computation is based on reachability, e.g., the route requests are sent to adjacent devices till it reaches the destination device, only local constraints can be incorporated in route computation. In contrast, because the central controller in accordance with the present disclosure has access to comprehensive information of the overall network, it can take into consideration of global constrains for route computation which can be performed along the lines of path computation elements (PCE).

Figure 3A:
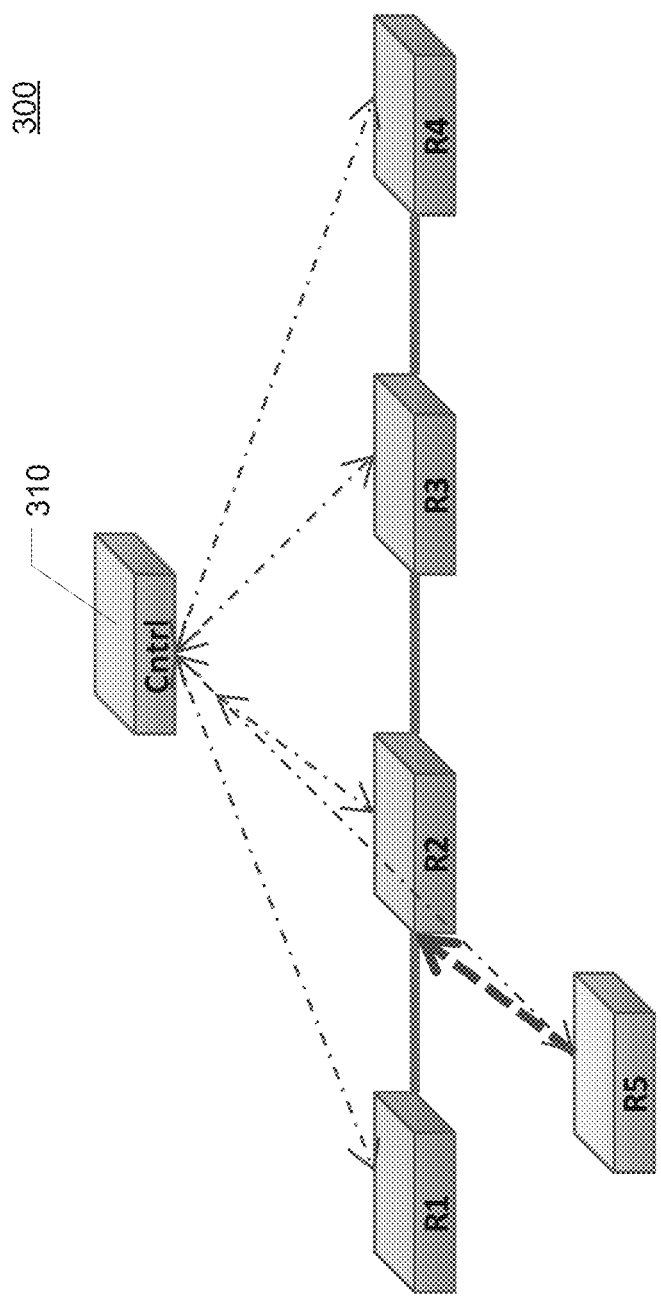
FIG. 3A is a diagram illustrating an exemplary network in which a data transmission path that satisfies route constraints can be determined by a central controller in accordance with an embodiment of the present disclosure.

In some embodiments, a central controller can be used to compute a route only when certain constraints accompany a route request. FIG. 3A is a diagram illustrating an exemplary network 300 in which a data transmission path that satisfies route constraints can be determined by a central controller in accordance with an embodiment of the present disclosure. The network 300 may have a similar composition and configuration as network 100 in FIG. 1A. For example, during operation, for example, a source device, e.g., a newly joined device, sends out a special route request to the central controller to query for a constraint route to destination device R4. Along with the request, R5may also send constraints like bandwidth for certain time period, and etc. When the controller receives this request, it computes the route from R5 to R4 and sends out a unicast route response to R5. In some embodiments, R5 can then update the route if the route determined by the central controller is different from a route determined by R4 based on a conventional AODV model.

Figure 3B:
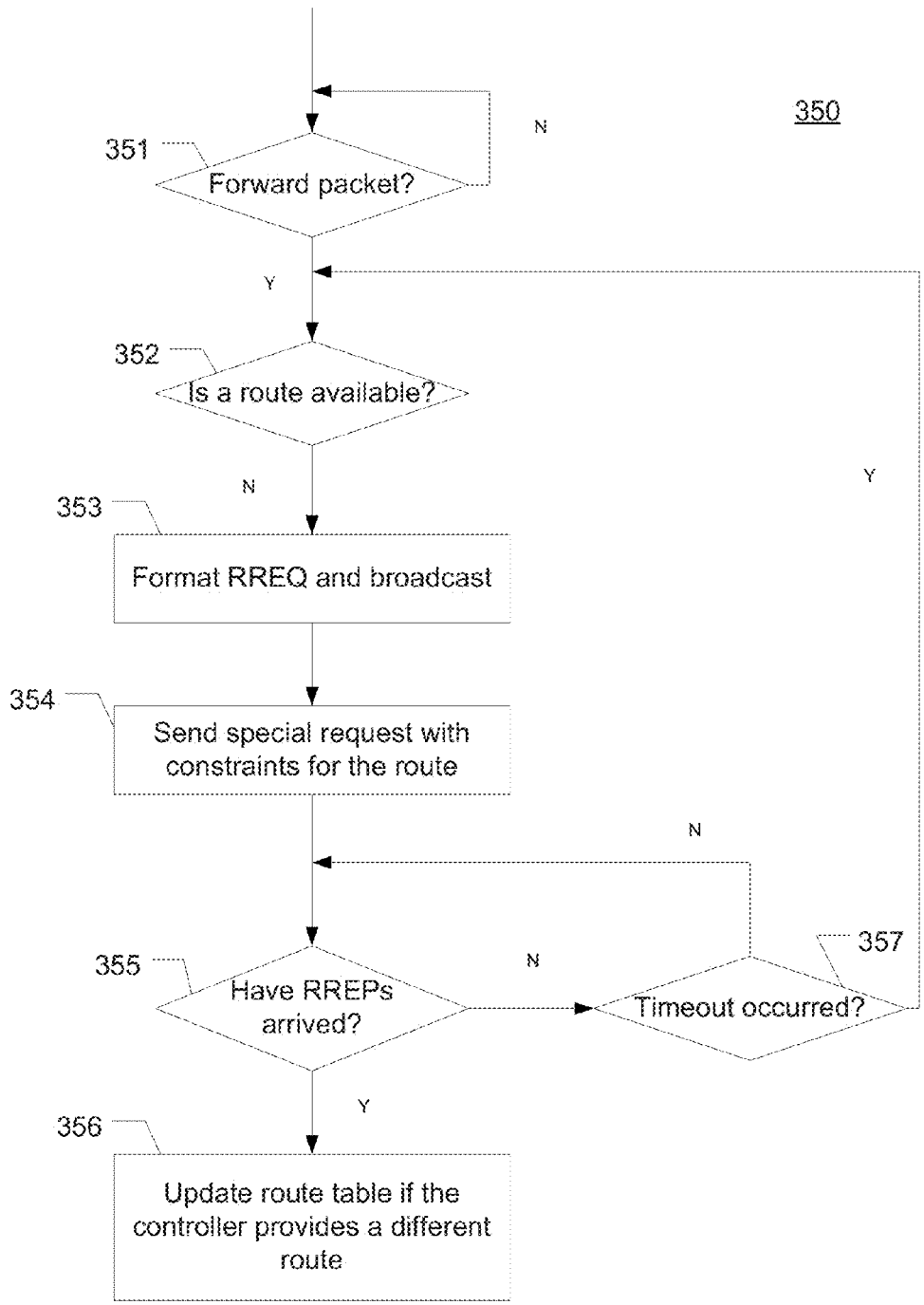
FIG. 3B is a flow chart depicting an exemplary process for a network node to discover a route with constraints in an ad hoc on-demand network by unicasting a special route request to a central controller with an embodiment of the present disclosure.

FIG. 3B is a flow chart depicting an exemplary process 350 for a network node to discover a route with constraints in an ad hoc on-demand network by unicasting a special route request to a central controller with an embodiment of the present disclosure. The process 350 may be implemented as a software program, hardware logic, or a combination thereof, in a network device, e.g., a router. In some embodiments, when a source node decides to forward a data packet to a destination node at 351, it first determines at 352 whether there is a route to the desired destination node currently known or available to the source node.

If it is determined that a route is currently unavailable or unknown, the source node can generate a route request message and broadcast it to the network at 353. For instance, the route request message may be in the similar format as the RREQ used in a conventional AODV model. The route request message propagated through the other network devices and a route can be discovered in accordance with a conventional AODV model.

In addition, the source can also unicast a request to the central controller with constraints for the route at 354. Upon receiving the request, the central controller can identify the source node and its location in the network, perform constrained route computation, and send back a route response to the source with the identified route with constraints.

If the route response messages are received at the source device, as determined at 355, and if different routes are identified in the messages, the source device can update the route table accordingly at 356. If a route response message is not received by the source node within a predetermined interval, time out occurs at 357 and the foregoing 352-355 can be repeated.

Figure 4:
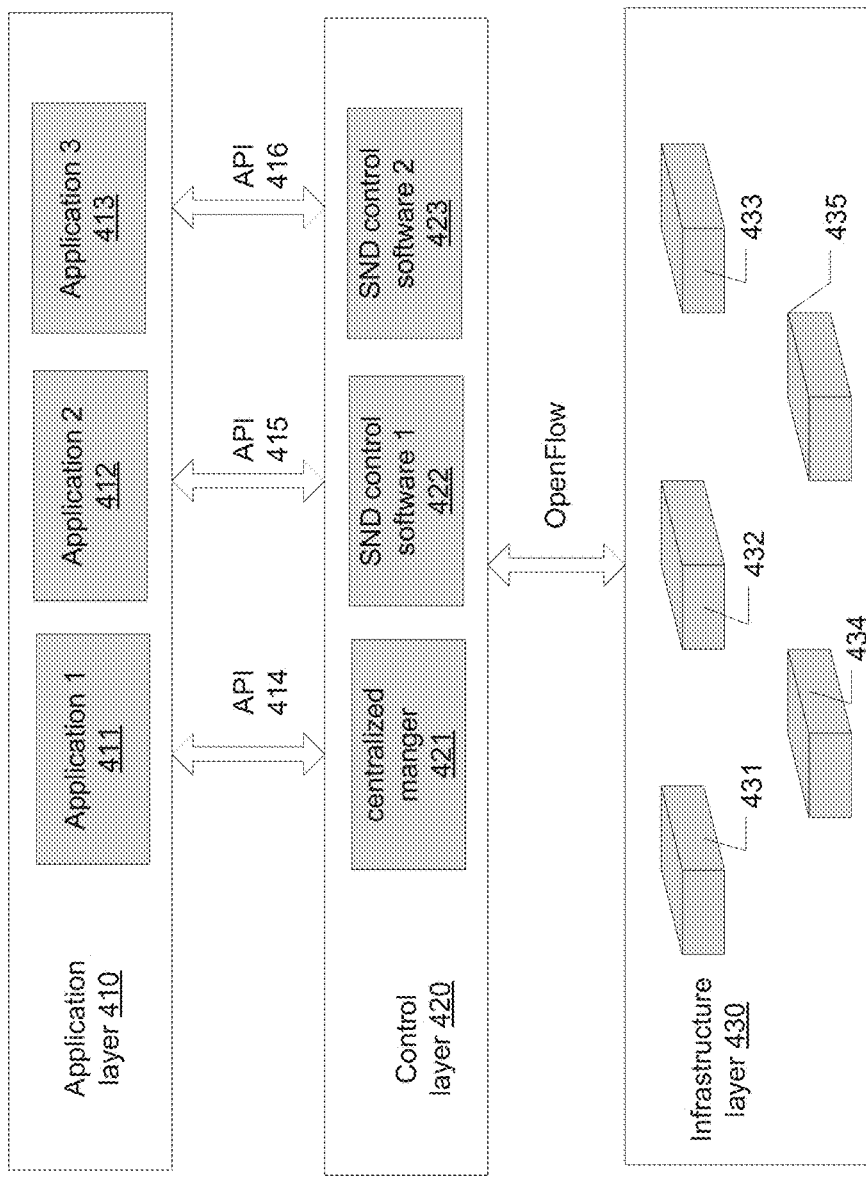
FIG. 4 is a block diagram illustrating an exemplary architecture of a software-defined network in which a central controller can be used for route determination in an ad hoc on-demand network in accordance with an embodiment of the present disclosure.

FIG. 4 is a block diagram illustrating an exemplary architecture of an SDN 400 in which a central controller can be used for offline route determination in an ad hoc on-demand network in accordance with an embodiment of the present disclosure. The SDN 400 includes three logic layers, the application layer 410, the control layer 420, and the infrastructure layer 430, with the control layer 420 acting as the interface between the application layer 410 and the infrastructure layer 430.

The infrastructure layer 430 includes the network hardware devices 431-435 coupled in the network, e.g., SDN switches or SDN routers. The control layer 420, or the SDN controller, can offer proprietary programming interfaces to network devices and management. The control layer 420 may include one or more control software programs, e.g., 421-423, wherein one control manager program 421, when executed by a processing unit, can perform the central controller function as discussed with reference to FIGS. 1A, 1B, 2A, 2B, 3A, and 3B. The control layer 420 may communicate with the network devices in the OpenFlow protocol.

The application layer 410 may include application programs 411-413 and can deliver network functions or services in software on a virtual machine or only creating an overly network. For example, the application programs 411-413 can be related to virtual cloud, load balancing, business applications, network security, burst transmission, to name a few. The application layer 410 may communicate with the control layer application program interfaces 414-416 corresponding to respective application programs 411-413.

Figure 5:
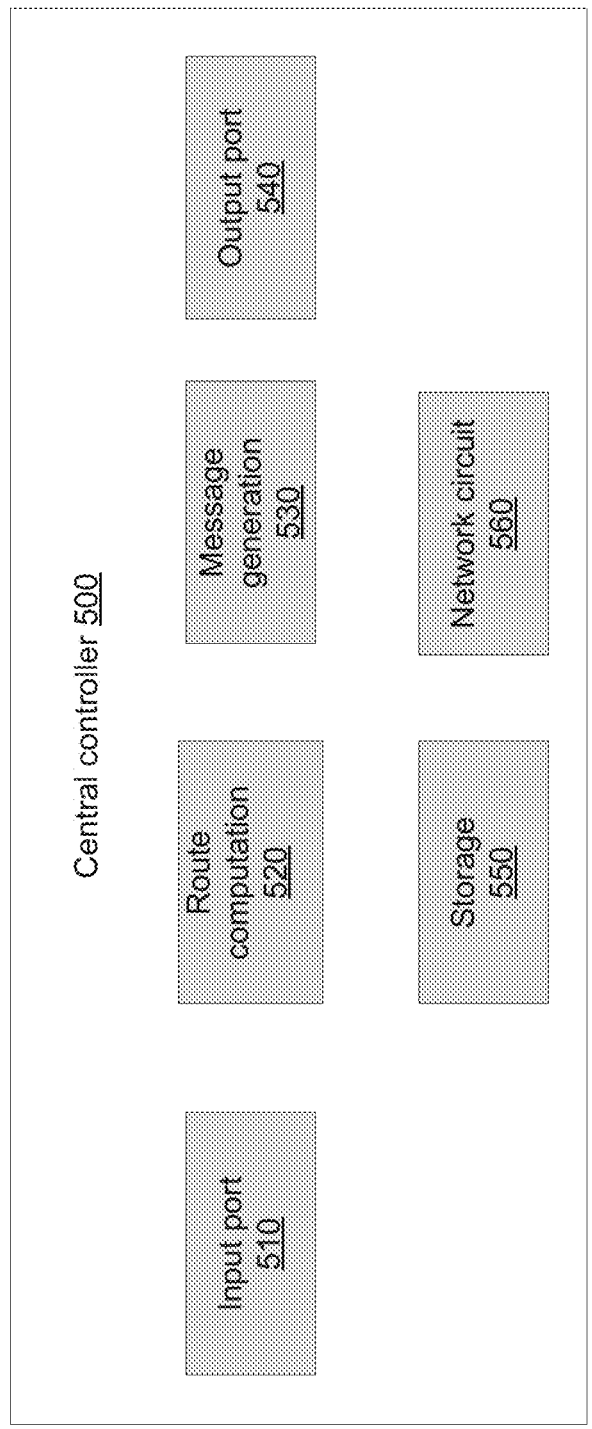
FIG. 5 is a block diagram illustrating an exemplary configuration of a central controller capable of performing on-demand routing in an ad hoc network in accordance with an embodiment of the present disclosure.

FIG. 5 is a block diagram illustrating an exemplary configuration of a central controller 500 capable of performing on-demand routing in an ad hoc network in accordance with an embodiment of the present disclosure. Different components illustrated in the central controller 500 may be implemented as software programs, hardware logic, or a combination thereof. For example, the central controller may be a control manager in a control layer of a SDN, as illustrated in FIG. 4. The central controller 500 includes an input interface 510, a route computation module 520, a message generation module 530, an output interface 540, a storage module 550 and a network circuit 560. The input interface can operate to receive route requests from a network device within the network. The route computation module 520 is configured to determine transmission paths, e.g., based on topology information of the network, in accordance with any suitable algorithm or routing model. The message generation module 530 can generate a route response that identifies the computed route in accordance with any suitable format recognizable by the pertinent network devices. The output interface 540 is configured to send the route response to a network device. The storage module 550 may store the topology information of the network that can be used for route computation. The network circuit 560 can render a network connection between the controller and the network devices in the network.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of routing data in an ad-hoc communication network comprising a plurality of network nodes and a central controller, said method comprising:
   receiving a routing request sent from a first network node in the plurality of network nodes by virtue of unicast to said central controller, wherein said routing request comprises a request to identify a transmission path for routing data from said first network node to a second network node in the plurality of network nodes;
   receiving another routing request sent from said first network node by virtue of broadcast to said central controller and said plurality of network nodes;
   at said central controller, determining identified transmission paths in an offline and centralized manner based on a topology of the plurality of network nodes in said ad-hoc communication network in response to said routing request and in response to said another routing request, wherein said identified transmission paths are available for data transmission between said first network node and said second network node; and
   sending routing responses from the central controller in response to said routing request and said another routing request to said first network node through unicast, wherein said routing responses identify said identified transmission paths for selection by said first network node.

2. The method of claim 1, wherein
   said routing request comprises a request to identify at least one of said transmission paths with said route constraint,
   said route constraint comprises a global constraint for the topology with respect to said ad hoc communication network, and
   said determining comprises determining said at least one identified transmission path by incorporating said route constraints.

3. The method of claim 2,
   wherein said second network node sends said another routing response to said first network node in response to said broadcast, and
   said another routing response identifies one of said transmission paths available for data transmission between said first network node and said second network node.

4. The method of claim 3, wherein said another routing response is independent of said route constraints.

5. The method of claim 1, wherein
   said second network node sends the another routing response to said first network node in response to said broadcast,
   said another routing response identifies one of the transmission paths available for data transmission between said first network node and said second network, and
   said first network node selects between said identified transmission paths.

6. The method of claim 1, wherein said ad-hoc communication network comprises a software defined network (SDN), and wherein said plurality of network devices comprise routers and network switches.

7. The method of claim 1, wherein said method is a computer implemented method.

8. The method of claim 1, wherein said determining comprises determining said identified transmission paths using one or more of an adaptive routing process, a deflecting routing process, an edge disjoint shortest pair process, a Dijkstra's process, a fuzzy routing process, a geographic routing process, a Heuristic routing process, or a hierarchical routing process.

9. A control system within a software defined network (SDN), wherein said control system is coupled to a plurality of network devices within said SDN and accesses topology information of said SDN and intelligently controls data traffic among said plurality of network devices, said control system comprises:
a physical input interface receiving a route request from a first network device in the plurality of network devices within said SDN, wherein
said route request comprises a request to identify a transmission path with route constraints for routing data from said first network device to a second network device in the plurality of network devices within said SDN,
said route request is sent to said control system via unicast,
said route request is sent to said plurality of network devices via broadcast within said SDN, and
the second network device sends another route response to said first network node in response to said route request by virtue of unicast;
a route processor coupled to said input interface and determining a first transmission path based on said topology information of said ad-hoc communication network and based on the route constraints received in said route request, wherein said first transmission path is feasible for data transmission between said first network device and said second network device;
a message generator coupled to said route processor and generating a route response that identifies said first transmission path, and wherein said another route response identifies a second transmission path feasible for data transmission between said first network device and said second network device: and
a physical output interface coupled to said message generator sending said route response and said another route response to said first network device via unicast, wherein one of said route response and said another route response is selected by the first network, which selected route response comprises information used for updating a routing table associated with said first network device.

10. The control system of claim 9, wherein said route request is sent to said control system via broadcast.

11. A method of transmitting data through an ad-hoc communication network comprising a plurality of network nodes and a central controller, said method comprising:
sending a route request to a central controller of said ad-hoc communication network and to said plurality of network nodes by virtue of broadcast, wherein said route request comprises a request to identify a transmission path for routing data from the central controller and a first network device in the plurality of network devices to a second network device in the plurality of network devices within said ad-hoc communication network, wherein said central controller and said first network device determine first and second transmission paths, respectively, based on a topology of said ad-hoc communication network in response to said route request;
receiving a first route response from said central controller via unicast, wherein said first route response identifies the first transmission path linking said first network device and said second network device, and receiving a second route response from said second network device via unicast, wherein said second route response identifies the second transmission path linking said first network device and said second network device; and
selecting one of the first transmission path determined by the central controller and the second transmission path determined by the first network device to link the first network device to the second network device.

12. The method of claim 11, wherein said ad-hoc communication network comprises a software-defined network (SDN), and wherein said central controller is a SDN controller.

13. The method of claim 12, wherein said route request comprises route constraints with respect to data transmission between said first and said second network devices, and wherein said first transmission path is determined by incorporating said route constraints.

14. The method of claim 13 further comprises:
broadcasting the second route request to said SDN; and
receiving the second route response from said second network device, wherein said second route response identifies the second transmission path between said first and said second network devices based on an ad hoc on-demand distance vector routing method.

15. The method of claim 11, wherein
said ad-hoc communication network comprises a SDN, and
said central controller is a SDN controller,
said sending comprises sending the second route request to said SDN controller via broadcast to said SDN, and
said method further comprises:
receiving the second route response from said second network device, wherein said second route response identifies the second transmission path between said first and said second network devices based on an ad hoc on-demand distance vector routing method; and
selecting a resultant transmission path from said first transmission path and said second transmission path.

16. The network device of claim 15, wherein said SDN controller is a centralized controller that is distributed in multiple network devices of said plurality of network devices.

* * * * *